US008172601B2

(12) United States Patent
Adachi et al.

(10) Patent No.: US 8,172,601 B2
(45) Date of Patent: May 8, 2012

(54) MOTOR CABLE DEVICE AND RESIN COMPONENT EMPLOYED THERETO

(75) Inventors: Hideomi Adachi, Kosai (JP); Hidehiko Kuboshima, Kosai (JP)

(73) Assignee: Yazaki Corporation, Tokyo (JP)

( * ) Notice: Subject to any disclaimer, the term of this patent is extended or adjusted under 35 U.S.C. 154(b) by 22 days.

(21) Appl. No.: 12/659,467

(22) Filed: Mar. 10, 2010

(65) Prior Publication Data

US 2010/0248529 A1     Sep. 30, 2010

(30) Foreign Application Priority Data

Mar. 30, 2009   (JP) ................................. 2009-082042

(51) Int. Cl.
*H01R 13/56*   (2006.01)
(52) U.S. Cl. .......................................... 439/447; 385/60
(58) Field of Classification Search .................. 439/445, 439/447, 448; 385/60, 72, 78
See application file for complete search history.

(56) References Cited

U.S. PATENT DOCUMENTS

| | | | |
|---|---|---|---|
| 4,842,550 A * | 6/1989 | Fry et al. ........................ 439/471 |
| 5,460,540 A * | 10/1995 | Reichle ........................ 439/445 |
| 5,710,851 A * | 1/1998 | Walter et al. ..................... 385/86 |
| 6,225,557 B1 * | 5/2001 | Fonteneau et al. ............... 174/50 |
| 6,390,687 B1 * | 5/2002 | Shirakawa ....................... 385/86 |
| 6,485,194 B1 * | 11/2002 | Shirakawa ....................... 385/78 |
| 6,773,296 B2 * | 8/2004 | Kihira et al. ................... 439/445 |

FOREIGN PATENT DOCUMENTS

JP     2008-253017     10/2008

* cited by examiner

*Primary Examiner* — Thanh Tam Le
(74) *Attorney, Agent, or Firm* — Edwards Wildman Palmer LLP

(57) ABSTRACT

The motor cable device which can prevent damage on an inverter-side connecting member of the motor cable device and lowering in a connecting reliability of the inverter-side connecting member is provided. Also, a resin component used in the above-described motor cable device is provided. The motor cable device electrically connects a motor and an inverter and includes an inverter-side protector and a motor-side protector. The inverter-side protector includes a fixed end which is directly or indirectly fixed to the inverter and which supports the inverter-side connecting member. A swinging motion absorbing portion is formed continuously to the fixed end, the swinging motion absorbing portion being arranged to support a cable body at the inverter-side connecting member and absorb the swinging motion generated at the cable body of the motor cable device, is further included.

5 Claims, 8 Drawing Sheets

MOTOR CABLE DEVICE AND RESIN COMPONENT EMPLOYED THERETO

CROSS-REFERENCE TO RELATED APPLICATIONS

This application claims priority to Japanese Patent Application Number 2009-82042 filed on Mar. 30, 2009, the contents of which are fully incorporated herein by reference.

BACKGROUND

1. Field of the Invention

The present invention relates to a motor cable device electrically connecting a motor and an inverter, and a resin component used in the motor cable device.

2. Description of Related Art

An electric motor vehicle and a hybrid motor vehicle have a motor for a power source, an inverter generating three-phase AC necessary to drive the motor, and a motor cable device connecting the motor and the inverter.

Japan Patent Application Publication Number 2008-253017 discloses a motor cable device having a cable body including a plurality of cables, a motor-side connecting member provided at one end of the cable body to which the motor is connected, and an inverter-side connecting member provided at the other end of the cable body to which the inverter is connected, and a cable holder provided at an intermediate portion of the cable body to fix the intermediate portion of the cable to a vehicle body.

The cable holder is fixed to the vehicle body by mounting plates and clamps. The cable holder, the mounting plates and the clamps are fix members fixing the cable body to the vehicle body, and are provided to regulate a motion (such as a swinging motion) of the cable caused by vibration or shock generated at the vehicle.

The invention of the prior art has following problems. That is, since the motor, the power source, generates vibration, the generated vibration is transmitted to the fix members through the cable body. If the fix members have structural gap, the vibration transmitted to such fix members may cause abnormal noise and/or damage. Another problem is that the fix members cannot be provided depending on the structure of the vehicle.

SUMMARY OF THE INVENTION

In view of the above-described problems, the inventor's idea is that by actively and positively allowing the vibration of the motor or the shock to be transmitted to the cable body and allowing the cable body to swing, so that the vibration of the motor and such can be absorbed with this swinging motion of the cable body. Furthermore, according to the above-described idea, the fix members of the prior art as described above can be eliminated, solving the above-described problems.

However, when the swinging motion is generated at the cable body, a force induced by this swinging motion may have an influence especially on the inverter-side connecting member. Thus, according to the above-described idea, there is still a risk of damaging the inverter-side connecting member and lowering a connecting reliability of the inverter-side connecting member.

In view of the above-described problems, an object of the present invention is to provide a motor cable device which can prevent damage on the inverter-side connecting member of the motor cable device and which can prevent lowering in a connecting reliability of the inverter-side connecting member. Another object of the present invention is to provide a resin component used in the above-described motor cable device.

For achieving the object, a motor cable device according to the present invention, the motor cable device for electrically connecting a motor and an inverter, has: a cable body including a plurality of cables; a motor-side connecting member provided to one end of the cable body; an inverter-side connecting member provided at the other end of the cable body; and a resin component having a fixed end which is directly or indirectly fixed to the inverter and which supports the inverter-side connecting member, wherein the cable body is arranged so as vibration of the motor or shock from an external environment is transmitted to the cable body to generate a swinging motion at the cable body, wherein a swinging-motion absorbing portion is formed continuously to the fixed end of the resin component, the swinging-motion absorbing portion being arranged to support the cable body at the inverter-side connecting member and absorb the swinging motion generated at the cable body.

According to the motor cable device as described above, the vibration of the motor and such is transmitted to the cable body, generating the swinging motion to the cable body. This swinging motion of the cable body at the swinging-motion absorbing portion can be absorbed by the swinging-motion absorbing portion formed at the resin component fixed to the inverter, preventing effect by a force of the swinging motion to the inverter-side connecting member connected to the inverter. As a result, damage on the inverter-side connecting member and lowering in a connecting reliability of the inverter-side connecting member can be prevented.

Furthermore, a motor cable device according to the present invention is the motor cable device as described above, wherein the swinging-motion absorbing portion has a recess at a free end thereof.

According to the invention described above, by using the recess, the shape of the cable body from the recess towards the motor can be easily formed into a non-planer shape. For example, if the cable body has three cables, one of the three cables in middle is placed at the recess and pulled out from the resin portion. Then, the rest of the cables on both sides of the middle cable are pulled out from the resin portion so as to gather inwardly. As a result, the cable body with three cables can be easily formed into a non-planer shape with a triangular cross section. Furthermore, providing the recess is also useful in order to assemble (band together) the plurality of cables in a predetermined position.

In a case of bending the cable body when wiring, the respective three cables are required to be different in lengths, giving a consideration regarding to looseness (or yield). If, for example, the cable body has the triangular cross section as described above, the cable body cannot be bent to be wired unless the cables are accurately aligned. However, by using the recess of the invention, the three cables can be banded (bundled together) in a predetermined position, thus the cable body can be bent and wired unimpededly. Furthermore, since the recess is formed at a part of the free end of the swinging-motion absorbing portion, the recess will not impair the function of the swinging-motion absorbing portion.

Furthermore, a motor cable device according to the present invention is the motor cable device as described above, wherein the resin component serves as a protector.

According to the invention described above, the inverter-side connecting member and the cable body thereat can be protected and guided by the resin component which serves as the protector.

For achieving the object, a resin component according to the invention employed to a motor cable device electrically connecting a motor and an inverter and including a cable body and an inverter-side connecting member, includes: a fixed end which is directly or indirectly fixed to the inverter and supports the inverter-side connecting member; and a swinging-motion absorbing portion arranged to support a cable body at the inverter-side connecting member and absorb a swinging motion generated at the cable body.

According to the invention described above, the swinging motion generated at the cable body can be absorbed by the swinging-motion absorbing portion. Thus, the inverter-side connecting member connected to the inverter will not be affected by the swinging motion, keeping a good connecting condition. Consequently, the resin component which can prevent damage on the inverter-side connecting member and which can prevent lowering in a connecting reliability of the inverter-side connecting member can be provided.

BRIEF DESCRIPTION OF THE DRAWINGS

FIG. 8A is a side view of the protector, and FIGS. 8B and 8C are views seen from directions indicated by arrows A and B of FIG. 8A, respectively. FIG. 8A is a side view of an exemplary embodiment in use of the protector shown in FIG. 7; FIG. 8B is a partial view of the exemplary embodiment in use of the protector shown in FIG. 7 when viewing from an arrow A shown in FIG. 8A; and FIG. 8C is a partial view of the exemplary embodiment in use of the protector shown in FIG. 7 when viewing from an arrow B shown in FIG. 8A.

DETAILED DESCRIPTION OF THE INVENTION

A motor cable device, electrically connecting a motor and an inverter, includes a resin component. This resin component has a fixed end which is fixed to the inverter directly or indirectly, and which supports an inverter-side connecting member of the motor cable device. The resin component also has a swinging motion absorbing portion continuous to the fixed end which supports a cable body adjacent the inverter-side connecting member and absorbs swinging motion of the cable body. The motor cable device includes the above-described resin component and the cable body at which the swinging motion is generated.

Figure 1:
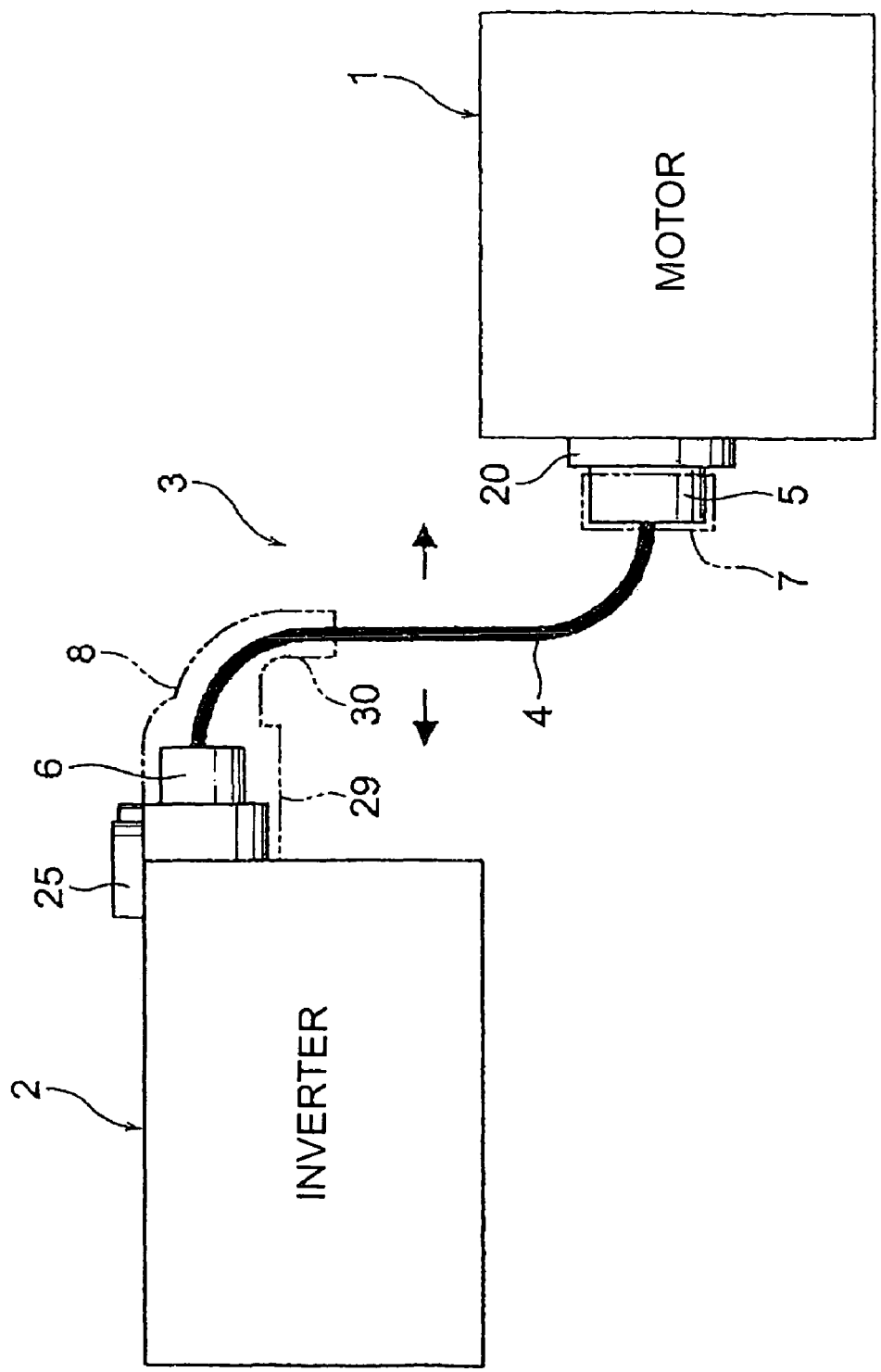
FIG. 1 is a schematic illustration of a motor cable device according to the present invention, the motor cable device being in use.
Figure 3:
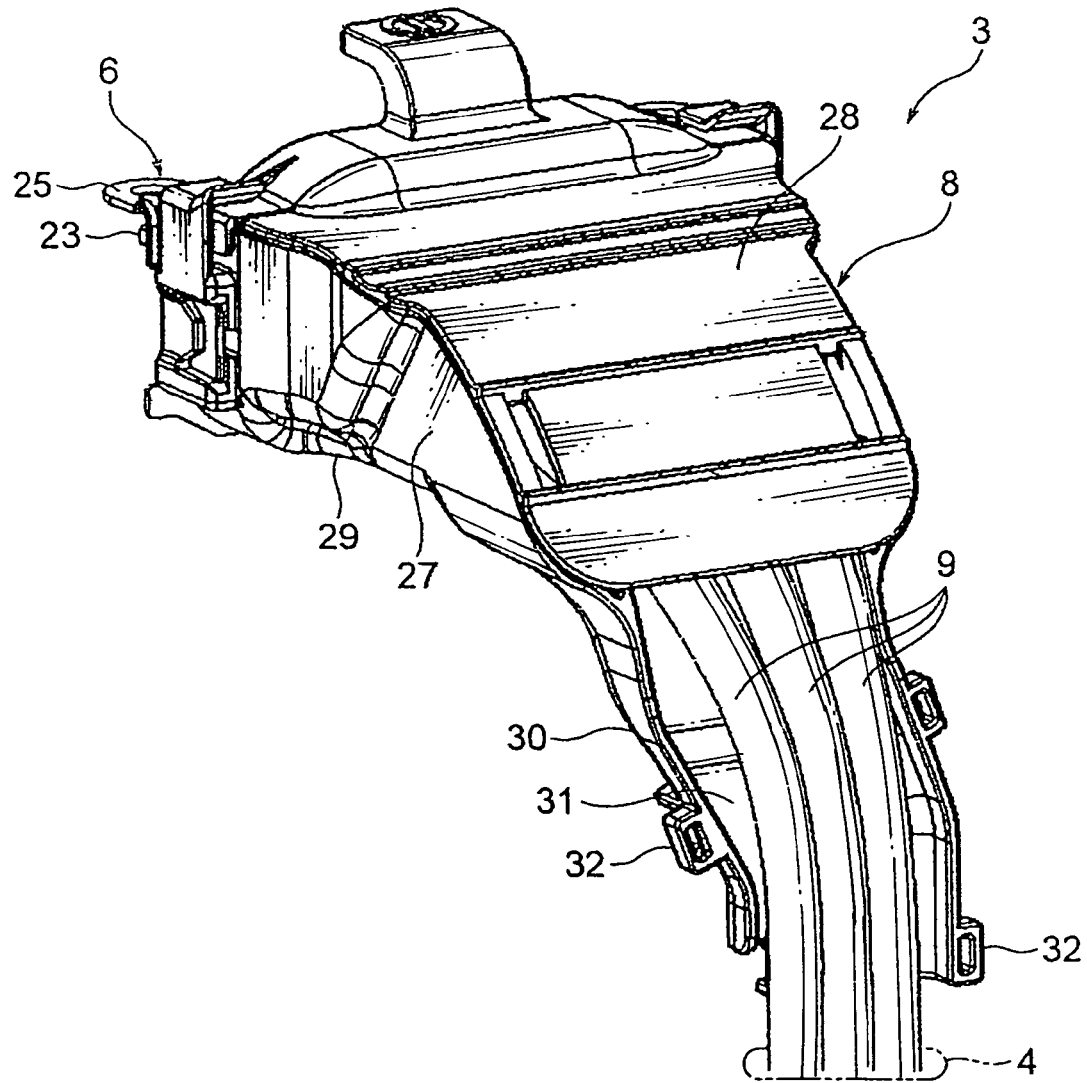
FIG. 3 is a perspective view of an inverter-side connecting member and a protector of the motor cable device shown in FIG. 2.
Figure 4:
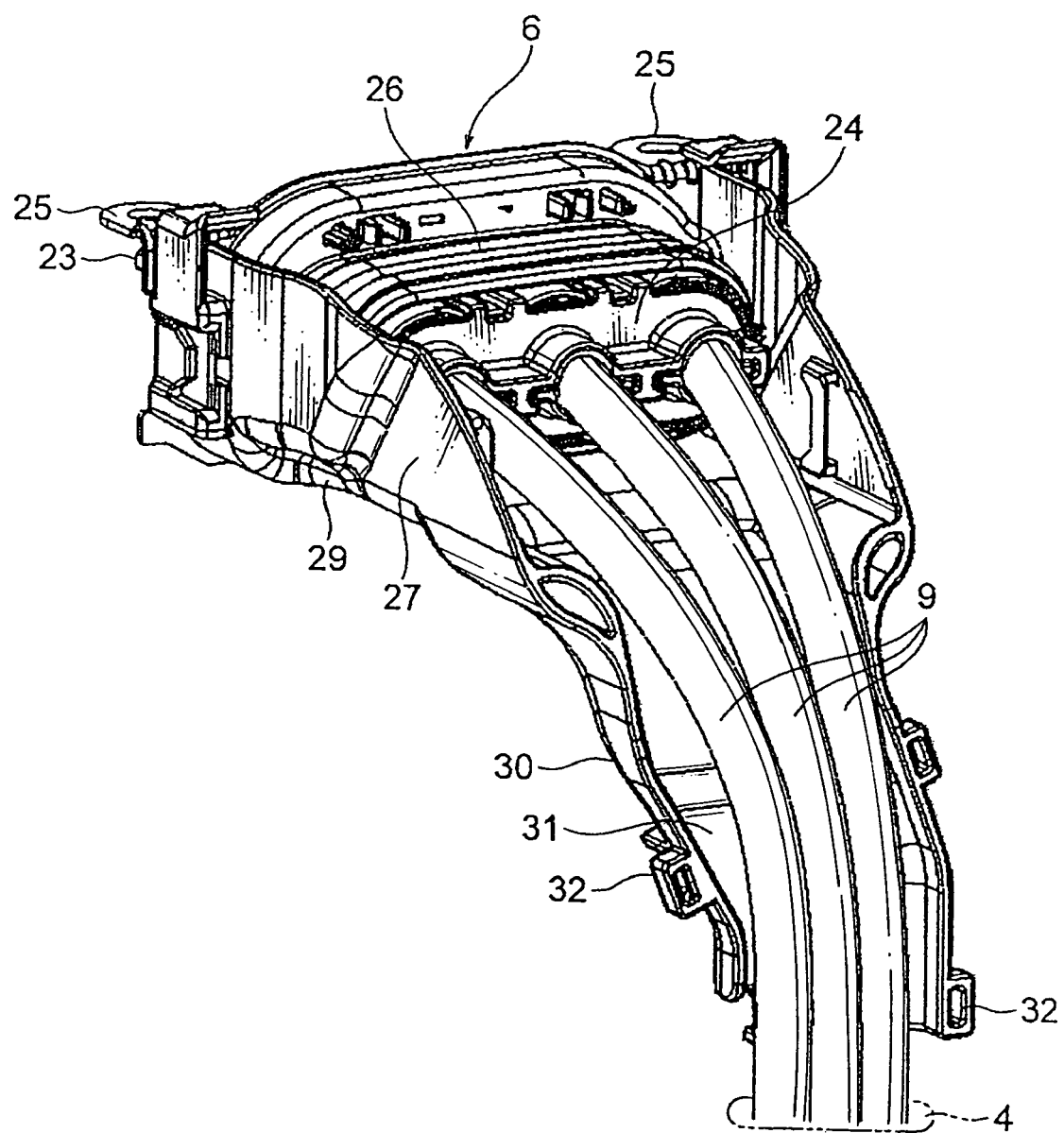
FIG. 4 is a perspective view of the inverter-side connecting member and the protector of the motor cable device of FIG. 3 by removing a cover.
Figure 5:
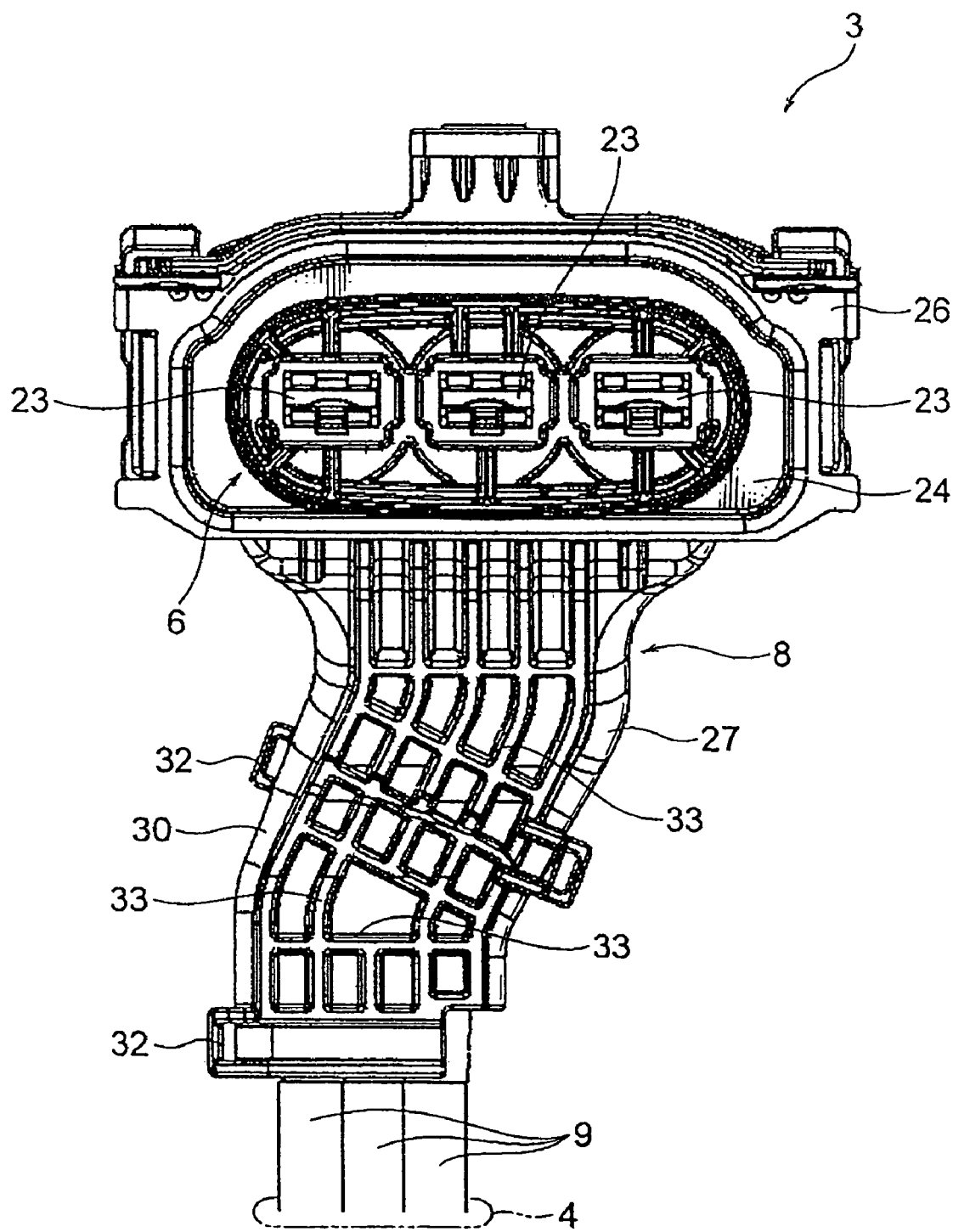
FIG. 5 is a front view of the inverter-side-connecting member and the protector of the motor cable device shown in FIG. 3.
Figure 6:
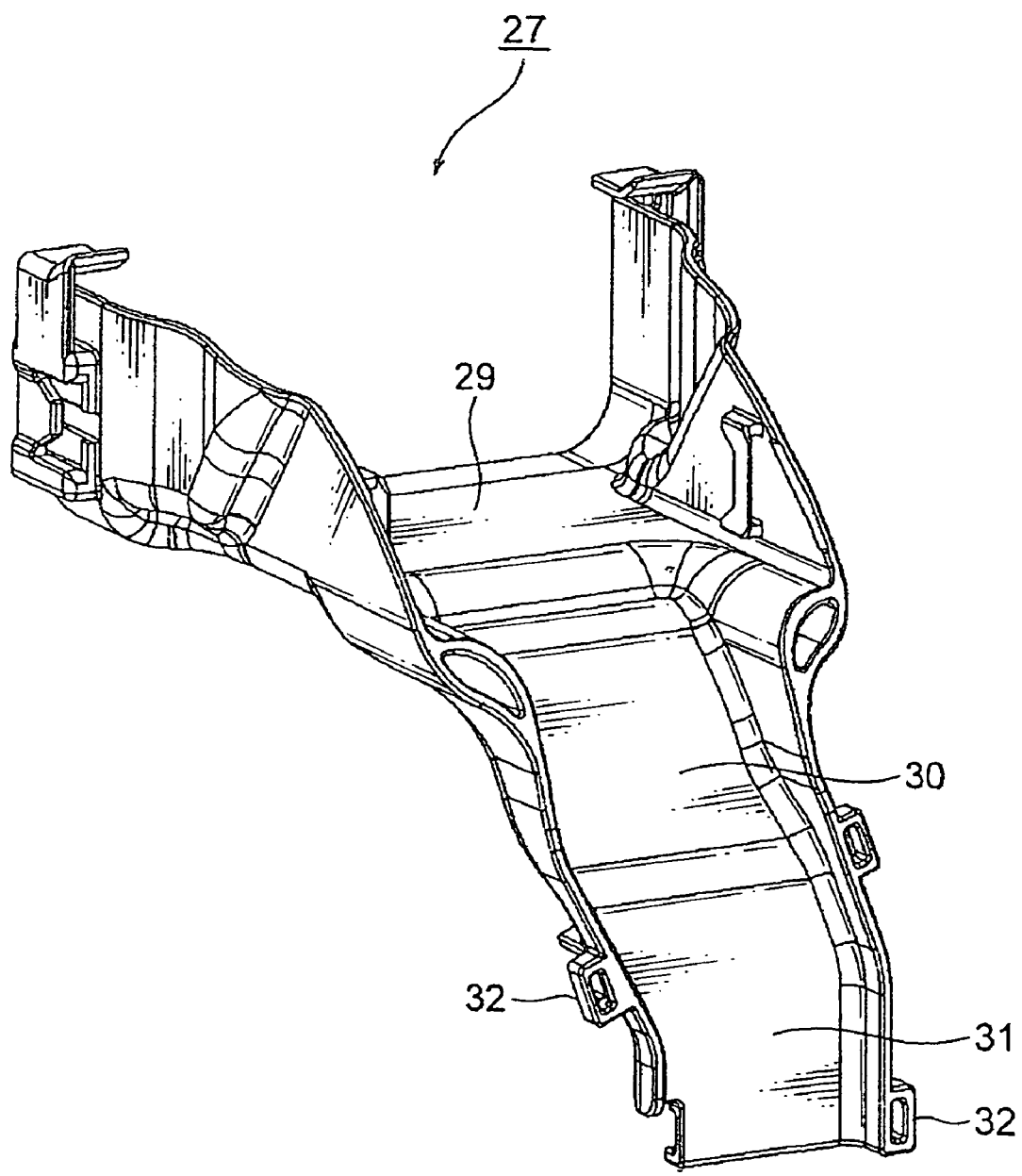
FIG. 6 is a perspective view of the protector of the motor cable device shown in FIG. 3.

A first exemplary embodiment is explained below with reference to FIGS. 1 through 6. FIG. 1 is a schematic illustration of the motor cable device according to the present invention in use, FIG. 2 is a perspective view of the inventive motor cable device, FIG. 3 is a perspective view of the inverter-side connecting member and a protector of the motor cable device, FIG. 4 is a perspective view of the inverter-side connecting member and the protector of the motor cable device of FIG. 3 without a cover, FIG. 5 is a front view of the inverter-side connecting member and the protector, and FIG. 6 is a perspective view of the protector alone.

In FIG. 1, a motor 1 and an inverter 2 of an electric motor vehicle or a hybrid motor vehicle are electrically connected to each other by a motor cable device 3. The motor cable device 3 includes: a cable body 4 having a plurality of cables; a motor-side connecting member 5 provided at one end of the cable body 4; an inverter-side connecting member 6 provided at the other end of the cable body 4; a motor-side protector 7 for the motor-side connecting member 5; and an inverter-side protector 8 for the inverter-side connecting member 6. The inverter-side protector 8 corresponds to a resin component described in claims.

The motor cable device 3 has a vibration-absorbing structure arranged so as to transmit vibration of the motor 1 and/or shock generated by the vehicle to the cable body 4, generate a swinging motion at the cable body 4 in directions indicated by arrows in FIG. 1, and absorb the vibration of the motor and such by the swinging motion of the cable body. Furthermore, the motor cable device 3 is structured so as the inverter-side protector 8 absorbs the swinging motion of the cable body 4 around the inverter-side connecting member 6, protecting the inverter-side connecting member 6 from being subjected to a negative influence. Specific structure of the motor cable device 3 will be explained below.

Figure 2:
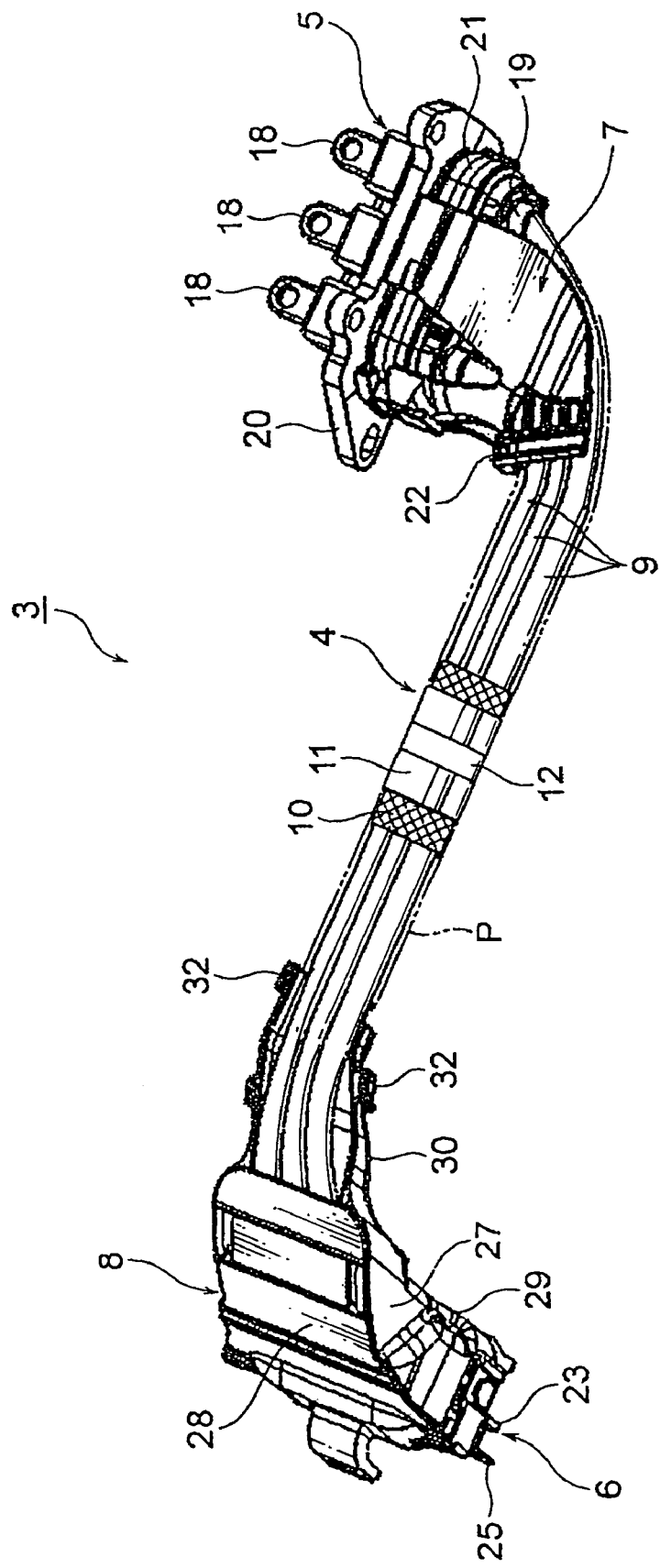
FIG. 2 is a perspective view of the motor cable device shown in FIG. 1.

As shown in FIG. 2, the cable body 4 includes: three high-voltage cables 9; a tube-like braid 10 receiving the three cables 9 in a lump; and a protection member 11 provided around the braid 10 so as to cover the braid 10. The three cables 9 of the cable body 4 are aligned in a line (aligned in a flat plane). The braid 10 is formed by thin conductive wires braided into a tube-like shape and is provided around the three cables 9. The braid 10 is a shield member, and both ends thereof are fixed to respective earth of the motor-side connecting member 5 and the inverter-side connecting member 6, respectively, in a prescribed manner.

The protection member 11 is an armoring material and serves as a protection from external environment. The protection member 11 is an abrasion-resistant and flexible seat-like member which is wrapped around the braid 10. The protection member 11, for example a twist tube, is provided with a tape 12 to prevent unwrap of the protection member 11. The total length of the protection member 11 is slightly shorter than the braid 10, and boundary area in which the braid 10 is exposed is wrapped with an acetate cloth tape, forming an acetate tube (not shown). An imaginary line P in FIG. 2 indicates that the length of the protection member 11 is long enough to reach to both the motor-side protector 7 and the inverter-side protector 8.

As shown in FIG. 2, the motor-side connecting member 5 includes: terminal clamps 18 each provided to an end of the respective three cables 9; an insulating housing 19 for receiving and retaining the terminal clamps 18; an earth 20 grounded to the motor 1 (shown in FIG. 1); and a metal shell 21 which retains and connects one end of the braid 10 to the earth 20. A structure of the motor-side connecting member 5 is of known, thus specific explanation thereof is eliminated.

The motor-side protector 7 is made of an insulating resin and is formed so as to protect the motor-side connecting member 5 as well as to guide the one end of the cable body 4.

A fixing section 22 is provided for fixing the one end of the cable body 4 by a band (not shown). In this embodiment, although it is not shown in FIG. 2, the acetate tube is also provided around the fixing section 22 (around the band).

As shown in FIGS. 4 and 5, the inverter-side connecting member 6 includes: terminal clamps 23 each provided to the other end of the respective three cables 9; an insulating housing 24 for receiving and retaining the terminal clamps 23; an earth 25 grounded to the inverter 2 (shown in FIG. 1); and a metal shell 26 which retains and connects the other end of the braid 10 to the earth 25. A structure of the inverter-side connecting member 6 is of known, thus specific explanation thereof is eliminated.

As shown in FIGS. 3 through 6, the inverter-side protector 8 is made of an insulating resin and includes a protector body 27 and a cover 28 engaging therewith. The inverter-side protector 8 serves as a protector for the inverter-side connecting member 6 and also a guide for the other end of the cable body 4. Furthermore, the inverter-side protector 8 absorbs a swinging motion of the cable body 4 near the inverter-side connecting member 6. The inverter-side protector 8 is formed into an L-like shape seen from a side.

The protector body 27 includes a fixed end 29 and a swinging motion absorbing portion 30. The shape of the fixed end 29 is arranged to match with the shape of the inverter-side connecting member 6. Also, the fixed end 29 is formed so as to support the inverter-side connecting member 6 and is fixed directly or indirectly to the inverter 2 (shown in FIG. 1). The swinging motion absorbing portion 30 is formed continuously to the fixed end 29.

The absorbing portion 30 is formed so as to support the cable body 4 around the inverter-side connecting member 6 and absorb a swinging motion generated at the cable body 4. A holding portion 31 is formed at an inner surface of the absorbing portion 30, as shown in FIGS. 3 to 6. This holding portion 31 holds the three cables 9 at the other end of the cable body 4 so as to align the cables 9 in a line along the holding portion 31. A plurality of fixing sections 32 are provided to an outer surface of the absorbing portion 30 for fixing the other end of the cable body 4 by a band (not shown).

A plurality of ribs 33 is formed at the outer surface of the swinging motion absorbing portion 30 (i.e. opposite side of the holding portion 31). The plurality of ribs 33 extends to the fixed end 29 across a continuing portion where the fixed end 29 and the swinging motion absorbing portion 30 meet. The plurality of the ribs 33 is provided to adjust a hardness of the swinging motion absorbing portion 30. The hardness (rigidity) or flexibility of a portion of the protector body 27 around the above-described continuing potion and the swinging motion absorbing portion 30 can be increased by adjusting the height, position and the number of the plurality of the ribs 33.

The protector body 27 can be avoided from being twisted by the shape thereof and by the plurality of the ribs 33 arranged as shown in FIG. 5. Consequently, the protector body 27 arranged as described above allows the cable body 4 to swing efficiently in directions indicated by arrows in FIG. 1.

The cover 28 is, for example, arranged to cover the inverter-side connecting member 6.

When the motor 1 is driven, while the motor 1 and the inverter 2 being electrically connected by the motor cable device 3 having the above-described structure, the vibration of the motor 1 and/or the shock from an external environment (shock to the motor vehicle) is transmitted to the motor cable device 3, thereby generating the swinging motion at the cable body 4, in the directions indicated by the arrows in FIG. 1. This swinging motion eventually contributes in absorbing the above-described vibration and/or shock. The swinging motion absorbing portion 30 of the inverter-side protector 8 (shown in FIGS. 3 to 6) fixed to the inverter 2 can absorb the swinging motion of the cable body 4 at the swinging motion absorbing portion 30, preventing effect by a force of the swinging motion on the inverter-side connecting member 6. As a result, damage on the inverter-side connecting member 6 and lowering in a connecting reliability of the inverter-side connecting member 6 can be prevented.

Figure 7:
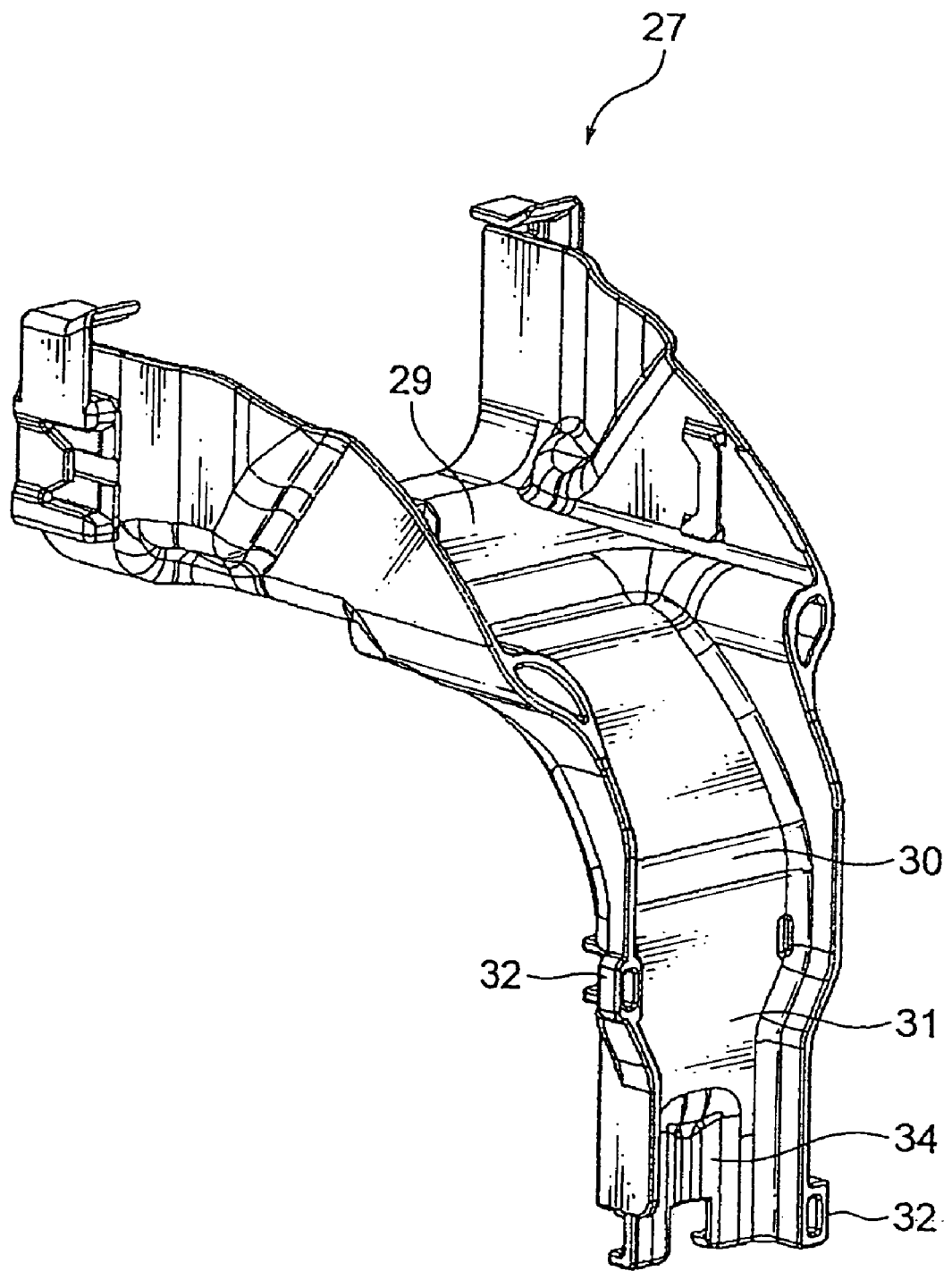
FIG. 7 is a perspective view of a modification of the protector of the inventive motor cable device shown in FIG. 6.
Figure 8A:
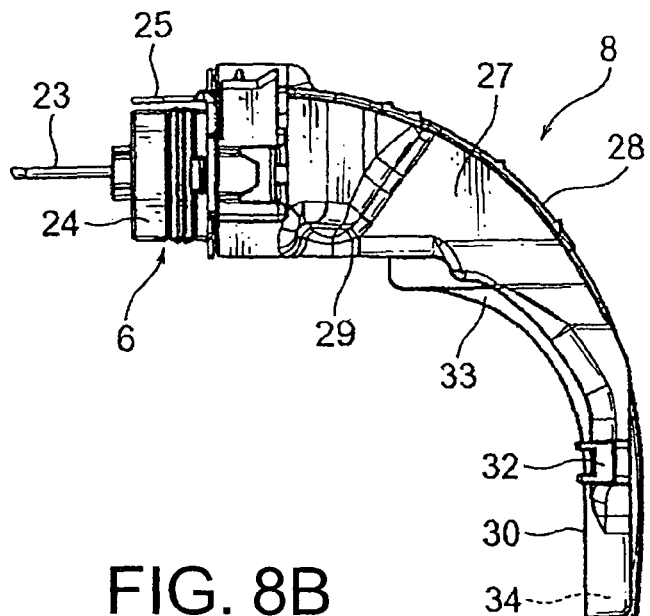
FIGS. 8A through 8C show the protector according to the exemplary embodiment in use.
Figure 8B:
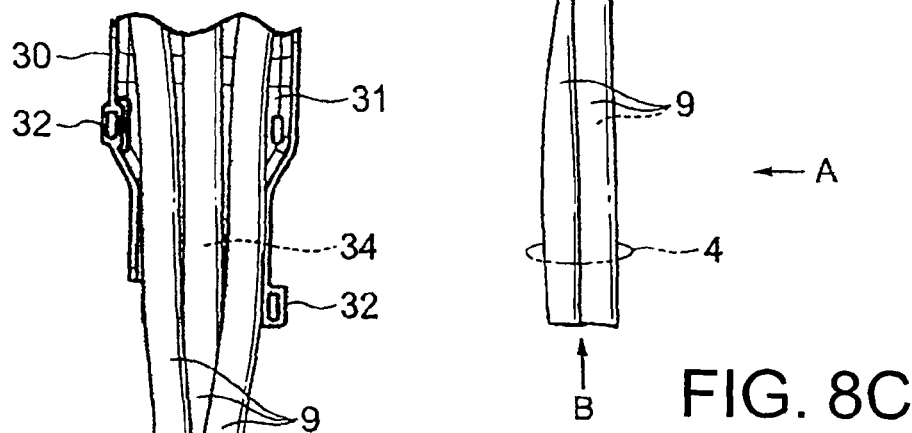
Figure 8C:
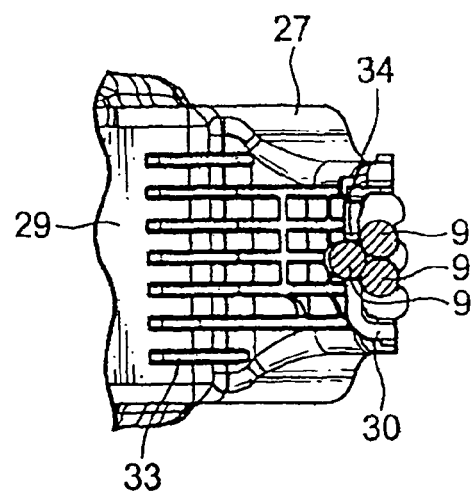

A second exemplary embodiment is explained below with reference to FIGS. 7, 8A, 8B and 8C. FIG. 7 is a perspective view of the second exemplary embodiment of the protector of the motor cable device. FIG. 8A through 8C each shows an example of use of the protector body of FIG. 7. The same reference number as the first embodiment indicates the same component.

As shown in FIG. 7, the protector body 27 includes the fixed end 29 and the swinging motion absorbing portion 30 formed continuously therewith. The holding portion 31 is formed at the inner surface of the absorbing portion 30. A recess 34 is formed at a free end of the swinging motion absorbing portion 30.

As shown in FIGS. 8A, 8B and 8C, the cables 9 are held at the holding portion 31 of the swinging motion absorbing portion 30 in a line along the holding portion 31. The shape of the cable body 4, including these three cables 9, around the free end of the swinging motion absorbing portion 30 can be easily formed into a non-planer shape by the recess 34. More specifically, by placing one of the three cables 9 in middle at the recess 34, and by gathering the other two cables 9 inwardly (FIG. 8B), the three cables 9 are easily arranged into a shape having a triangular cross section, as shown in FIG. 8C.

Thus, providing for example the recess 34 described above is advantageous in order to arrange the cables 9 into the non-planer shape.

Furthermore, providing the recess 34 is also advantageous in order to assemble (band together) the plurality of cables 9 in a predetermined position, as described more specifically earlier in the description.

Of course, various changes and modifications can be made within the scope of the invention.

The invention claimed is:

1. A motor cable device for electrically connecting a motor and an inverter, comprising:
   a cable body including a plurality of cables;
   a motor-side connecting member provided to one end of the cable body;
   an inverter-side connecting member provided at the other end of the cable body; and
   a resin component having a fixed end which is directly or indirectly fixed to the inverter and which supports the inverter-side connecting member,
   wherein the cable body is arranged so as vibration of the motor or shock from an external environment is transmitted to the cable body to generate a swinging motion at the cable body,
   wherein a swinging-motion absorbing portion is formed continuously to the fixed end of the resin component, the swinging-motion absorbing portion being arranged to support the cable body at the inverter-side connecting member, to absorb the swinging motion generated at the cable body and to support the plurality of cables in a contacting relationship with each other.

2. The motor cable device according to claim 1, wherein the swinging-motion absorbing portion has a recess at a free end thereof.

3. The motor cable device according to claim 1, wherein the resin component serves as a protector.

4. A resin component employed to a motor cable device electrically connecting a motor and an inverter, the motor cable device including a cable body and an inverter-side connecting member, the resin component comprising:
- a fixed end which is directly or indirectly fixed to the inverter and supports the inverter-side connecting member; and
- a swinging-motion absorbing portion arranged to support the cable body at the inverter-side connecting member, to absorb a swinging motion generated at the cable body and to support the plurality of cables in a contacting relationship with each other.

5. The motor cable device according to claim 2, wherein the resin component serves as a protector.

* * * * *